US008782701B2

(12) United States Patent
Yu et al.

(10) Patent No.: US 8,782,701 B2
(45) Date of Patent: Jul. 15, 2014

(54) METHOD FOR WATCHING MISSED TELEVISION PROGRAMS AND USER TERMINAL

(75) Inventors: Dawei Yu, Shenzhen (CN); Zhikun Guo, Shenzhen (CN); Yaosheng Lin, Shenzhen (CN); Yu Tan, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 261 days.

(21) Appl. No.: 13/033,077

(22) Filed: Feb. 23, 2011

(65) Prior Publication Data

US 2011/0197230 A1 Aug. 11, 2011

Related U.S. Application Data

(63) Continuation of application No. PCT/CN2009/073440, filed on Aug. 24, 2009.

(30) Foreign Application Priority Data

Aug. 23, 2008 (CN) .......................... 2008 1 0142075

(51) Int. Cl.
*H04N 5/445* (2011.01)
(52) U.S. Cl.
USPC .................... 725/40; 725/39; 725/46; 725/53; 725/58
(58) Field of Classification Search
CPC .......... H04N 21/42204; H04N 21/422; H04N 21/42208; H04N 21/42209; H04N 21/431; H04N 21/4312; H04N 21/4314; H04N 21/4316; H04N 21/4332; H04N 21/462; H04N 21/472; H04N 21/4755; H04N 21/482; H04N 21/4821; H04N 21/4823; H04N 21/4825; H04N 21/4826; H04N 5/445; G06F 3/048
USPC .......................................... 725/40, 46, 53, 58
See application file for complete search history.

(56) References Cited

U.S. PATENT DOCUMENTS

| 6,898,762 B2 * | 5/2005 | Ellis et al. ...................... 715/716 |
| 6,934,964 B1 | 8/2005 | Schaffer et al. |

(Continued)

FOREIGN PATENT DOCUMENTS

| CN | 1366771 A | 8/2002 |
| CN | 1426659 A | 6/2003 |

(Continued)

OTHER PUBLICATIONS

Written Opinion of the International Searching Authority (translation) dated (mailed) Nov. 26, 2009, issued in related Application No. PCT/CN2009/073440, filed Aug. 24, 2009, Shenzhen Huawei Technologies Co., Ltd. (4 pgs.).

(Continued)

*Primary Examiner* — An Son P Huynh
(74) *Attorney, Agent, or Firm* — Conley Rose, P.C.; Grant Rodolph; Nicholas K. Beaulieu (57) ABSTRACT

A method for watching a missed television (TV) program and a user terminal are provided. The method includes the following steps. Electronic program guide (EPG) information distributed by a headend is received, and a local table of missed programs and current time are obtained. It is determined that a missed program exits when the user terminal is in a nonworking status according to the local table of missed programs and the current time. Information of the missed program in the local table of missed programs is updated according to the EPG information. It is detected whether the missed program is played currently, and if yes, a service of watching a missed program is implemented. By using the method for making up for watching the missed TV program and the user terminal, when the missed program of the user is played in a system, the user is reminded in time of watching the missed program, and a trouble that the user searches the missed program through the EPG is avoided.

18 Claims, 5 Drawing Sheets

(56) References Cited

U.S. PATENT DOCUMENTS

| | | | |
|---|---|---|---|
| 7,882,528 B1* | 2/2011 | Taylor et al. | 725/58 |
| 8,499,256 B1* | 7/2013 | Iten et al. | 715/810 |
| 2002/0174430 A1* | 11/2002 | Ellis et al. | 725/46 |
| 2004/0019909 A1 | 1/2004 | Takahashi | |
| 2004/0085452 A1 | 5/2004 | Suzu | |
| 2004/0187164 A1* | 9/2004 | Kandasamy et al. | 725/132 |
| 2004/0237108 A1* | 11/2004 | Drazin et al. | 725/56 |
| 2005/0071874 A1 | 3/2005 | Elcock et al. | |
| 2005/0204387 A1* | 9/2005 | Knudson et al. | 725/52 |
| 2006/0078298 A1 | 4/2006 | Nishikawa et al. | |
| 2006/0130116 A1 | 6/2006 | Shi et al. | |
| 2006/0136966 A1* | 6/2006 | Folk, II | 725/58 |
| 2006/0271973 A1* | 11/2006 | Jerding et al. | 725/86 |
| 2007/0031111 A1* | 2/2007 | Thiagarajan et al. | 386/83 |
| 2007/0154163 A1 | 7/2007 | Cordray | |
| 2007/0154169 A1* | 7/2007 | Cordray et al. | 386/83 |
| 2007/0157242 A1* | 7/2007 | Cordray et al. | 725/46 |
| 2007/0157249 A1* | 7/2007 | Cordray et al. | 725/58 |
| 2007/0157250 A1 | 7/2007 | Morris | |
| 2008/0086743 A1* | 4/2008 | Cheng et al. | 725/38 |
| 2008/0244652 A1* | 10/2008 | Nakano | 725/40 |
| 2009/0025034 A1 | 1/2009 | Modiri et al. | |
| 2009/0178083 A1* | 7/2009 | White et al. | 725/61 |
| 2009/0235308 A1* | 9/2009 | Ehlers et al. | 725/34 |
| 2009/0248700 A1* | 10/2009 | Amano et al. | 707/10 |
| 2009/0328115 A1* | 12/2009 | Malik | 725/93 |
| 2010/0031162 A1* | 2/2010 | Wiser et al. | 715/747 |
| 2010/0175090 A1* | 7/2010 | Cordray | 725/58 |
| 2010/0251295 A1* | 9/2010 | Amento et al. | 725/38 |
| 2011/0176787 A1* | 7/2011 | DeCamp | 386/241 |

FOREIGN PATENT DOCUMENTS

| | | |
|---|---|---|
| CN | 1492672 A | 4/2004 |
| CN | 1997134 A | 7/2007 |
| CN | 101141587 A | 3/2008 |
| CN | 101656850 B | 7/2012 |
| EP | 1104189 A2 | 5/2001 |
| JP | 2007-282114 | 10/2007 |
| WO | WO 2007/053147 A1 | 5/2007 |

OTHER PUBLICATIONS

International Search Report from P.R. China in International Application No. PCT/CN2009/073440 mailed Nov. 26, 2009.

Extended European Search Report dated (mailed) Aug. 4, 2011, issued in related Application No. 09809223.2-1241, PCT/CN2009073440, Hauwei Technologies Co., Ltd.

Communication from a foreign counterpart application, European Application No. 09809223.2, Office Action dated Sep. 5, 2012, 5 pages.

\* cited by examiner

METHOD FOR WATCHING MISSED TELEVISION PROGRAMS AND USER TERMINAL

CROSS-REFERENCE TO RELATED APPLICATIONS

This application is a continuation of International Application No. PCT/CN2009/073440, filed on Aug. 24, 2009, which claims priority to Chinese Patent Application No. 200810142075.8, filed on Aug. 23, 2008, both of which are hereby incorporated by reference in their entireties.

FIELD OF THE TECHNOLOGY

The present invention relates to the field of digital television (TV), and more particularly to a method for watching missed TV programs and a user terminal.

BACKGROUND OF THE INVENTION

Digital TV program services increase, for example, Broadcast TV (BTV), Audio TV (ATV), Near Video On Demand (NVOD). A user can search for and view an interested program by browsing guiding contents in an Electronic Program Guide (EPG), the user can also subscribe to a program that is not played currently, and before the program starts, the user is automatically reminded of watching the program.

Though being reminded, the user misses a program at times for various reasons when the user is watching TV programs. Especially, when watching series in a channel, it is more easily for the user to miss one or several episodes. The programs may be re-played in the channel or be played in other channels. The user can browse an EPG of each channel provided in a digital TV system, and searches for and watches a favored program. If playing time of the favored program does not reach, the user can subscribe to the program, and when playing time of the favored program is reached, the system will automatically remind the user of watching the program. However, by using this method, the user only can make up for watching the program by remembering the playing time of the program or after searching in a large amount of EPG guiding information, thus a large amount of time and energy are wasted.

SUMMARY OF THE INVENTION

The embodiments of the present invention provide a method for watching a missed TV program. By using the method for watching the missed TV program, a system automatically collects and takes statistics on information of a program missed by a user, and the system reminds the user of watching the program when the missed program of the user is played, so that the user can watch the missed TV program, and thus the user does not need to search for the missed program through the EPG.

The embodiments of the present invention further provide a user terminal.

In order to achieve the objectives, embodiments of the present invention provides the following technical solutions.

A method for watching a missed TV program is provided. The method includes the following steps:

EPG information distributed by a headend is received, and a local table of missed programs and current time are obtained.

It is determined that a program is missed when the user terminal is in a non-working status according to the local table of missed programs and the current time, and information of the missed program in the local table of missed programs is updated according to the EPG information.

It is detected whether the missed program is played currently, and if the missed program is played currently, a service of watching the missed program is implemented.

A user terminal is provided. The user terminal includes a receiving module, a determining module, an updating module, and a missed program watching module.

The receiving module is configured to receive EPG information distributed by a headend after the user terminal starts to work, and obtain a local table of missed programs and current time.

The determining module is connected to the receiving module, and is configured to determine whether a program is missed when the user terminal is in a non-working status according to the local table of missed programs and the current time.

The updating module is connected to the receiving module, and is configured to update information of the missed program in the local table of missed programs according to the EPG information.

The missed program watching module is connected to the determining module, and is configured to sequentially detect whether the missed program is played currently according to rules, and if the missed program is played currently, implement a service of watching the missed program.

It can be known from the technical solutions that by using the method for watching the missed TV programs and the user terminal according to the embodiments of the present invention, relevant information in the EPG information can be automatically searched for according to after the user selects the information about a missed program once only, and then searched results are returned, so that a searching efficiency and pertinence of the searched results are improved, furthermore, when the missed program appears, the user is reminded in time of watching the program, so that the program will not be missed again, and therefore the experience of the user in watching programs is improved.

DETAILED DESCRIPTION OF THE EMBODIMENTS

In order to make the technical solution, objectives and merits of the present invention clearer, the present invention is described in detail by reference to the accompanying drawings and exemplary embodiments.

In an embodiment, the present invention provides a method for watching a missed TV program. The method includes the following steps: EPG information distributed by a headend is received, and a local table of missed programs and current time are obtained. It is determined that a program is missed when the user terminal is in a non-working status (such as a shut-down or sleep status) according to the local table of missed programs and the current time, and information of the missed program in the local table of missed programs is updated according to the EPG information. It is detected whether the missed program is played currently, and if the missed program is played currently, a service of watching the missed program is implemented. The implementing the service of watching the missed program includes that the user is prompted for whether to select to watch the missed program, and when the user selects to watch the missed program, a target channel is switched to and played and the local table of missed programs is updated. The local table of missed programs is set by the user, and the user can control the selecting of viewing detailed information of the local table of missed programs through a remote control.

By using the method for watching the missed TV programs according to the embodiment, relevant information in the EPG information can be automatically searched for according to after the user selects the information on the missed program once only, and when the missed program appears, the user is reminded in time of watching the program. In this manner, after missing a certain program, the user can learn about whether the program has been watched and obtain a corresponding reminder when the program is played, by performing simple operations. In this way, the user watches the missed program, and therefore the experience of the user in watching a program is improved.

Following describes the method for watching the missed TV program in more details.

Figure 1:
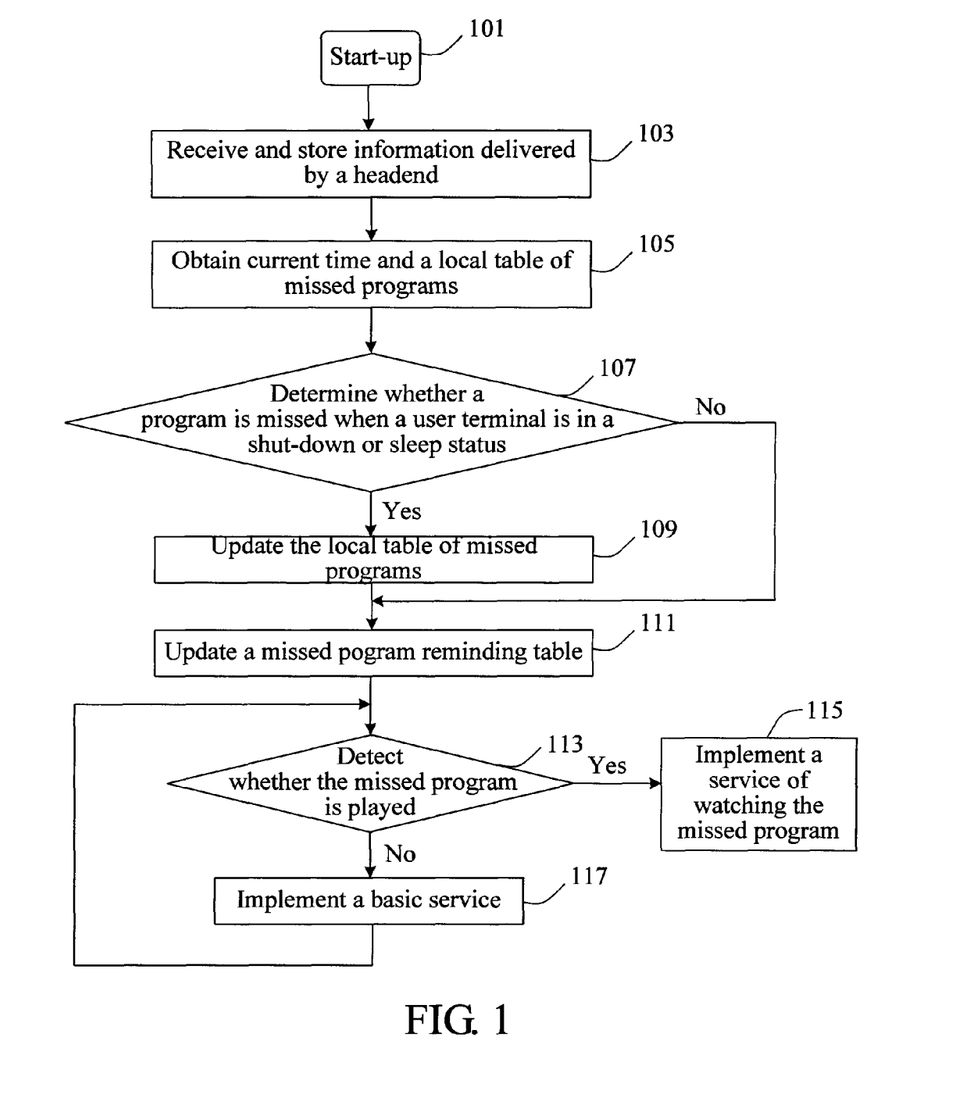
FIG. 1 is a flow chart of a start-up process of a user terminal in a method for watching a missed TV program according to an embodiment of the present invention.

Referring to FIG. 1, it is a flow chart of a start-up process of a user terminal in the method for watching the missed TV program according to an embodiment of the present invention.

Firstly, when the user terminal starts to work (starts up or wakes up from a sleep status, corresponding to step 101), the user terminal receives and stores information distributed by a headend (corresponding to step 103). The information is EPG information, which includes related information of programs.

Next, referring to step 105, the user terminal obtains current time and reads a local table of missed programs stored in the user terminal from a non-volatile memory.

Then, it is determined whether a program is missed when the user terminal is in a shut-down or sleep status according to the information obtained by performing the two steps (corresponding to step 107), and if a program is missed, the information of the missed program is updated to the local table of missed programs (corresponding to step 109), and a missed program reminding table corresponding to the local table of missed programs is updated (corresponding to step 111). If a program is not missed, the local table of missed programs remains unchanged. The missed program reminding table is associated with the local table of missed programs, and the user terminal prompts the user for whether to implement a service of watching the missed program according to the missed program reminding table and the current time. It can be determined whether the program is missed when the user terminal is in the shut-down or sleep state by comparing current time with the playing time of the program. If the current time is later than the playing time, the user terminal searches the EPG information, and a serial number of the episode to be played and the playing time in the EPG information are filled as current schedule and playing time. All the episodes between the current time and the playing time are recorded as missed programs. The example is for the situation when the missed program is a series, while the local table of missed programs further includes a local table of missed series and a local table of missed common programs. The following is an instance of a local table of missed series stored in the non-volatile memory of the user terminal

TABLE 1

Local table of missed series

| No. | Name of series | Alias of series | Total number of episodes of series | Language | Missed | Main channel | Current schedule | Playing time | Not watching |
|---|---|---|---|---|---|---|---|---|---|
| 1 | series 1 | Alias 1 of series 1 | 10 | Chinese | 5 | CCTV1 | 6 | 2008-08-08 10:30:00 | |
| 2 | series 2 | | 12 | Cantonese | 2, 5 | XX TV | 10 | 2008-08-09 14:00:00 | 2, 5 |
| 3 | series 3 | | 20 | English | 5, 7, 9 | XX TV | 20 | 2008-08-11 20:00:00 | 7, 9 |
| 4 | series 4 | | 40 | Chinese | 1 | XX TV | 2 | 2008-08-12 8:00:00 | 1 |

The definition of each field in Table 1 is as follows:

No.: the unique identifier of each record.

Name of series: the name of the series.

Alias of series: the different names that the same series may have.

Total number of episodes of the series: the total number of episodes of the series.

Language: the dubbing language of the series.

Missed: the serial number of the missed program in the series. If several episodes are missed, the serial numbers are separated by commas or other symbols.

Main channel: the channel on which the recorded data of the missed program is based. For example, the fifth episode of the series 1 recorded in No. 1 in the table is missed because the user does not watch it when the main channel CCTV1 plays the fifth episode of the series 1.

Current schedule: the serial number of a next episode to be played in the main channel.

Playing time: the playing time of the episode indicated in the field of current schedule. The field may include information of year, month, date, hour, minute, and second.

Not watching: when it is found that the program missed by the user is played, the user terminal prompts the user for whether to watch the missed program, and the user chooses not to watch it. Each time the user chooses not to watch the missed program, the serial number of the program is recorded once. If the user chooses not to watch the same program for several times, the serial number is recorded several times, which are separated by commas or other symbols. Therefore, the user will not be prompted for whether to watch the program which the user chooses not to watch the program for several times according to a certain policy.

For example, in the record of No. 1, the user starts up the user terminal and detects that current time is 18:00:00 of 2008-08-10, and it is found that the playing time has past after comparing the current time with the playing time of the sixth episode. Then, the EPG information is searched, and it is detected that the ninth episode will be played at 10:30:00 of 2008-08-11, which is then recorded in the fields of current schedule and playing time, and the sixth, seventh, and eighth episodes between the two times are all recorded in the field of missed.

If the user terminal is in a start-up state, it is detected whether the user terminal is in the channel of CCTV1 at 10:30:00 of 2008-08-08, and the user terminal being in the channel of CCTV1 indicates that the user is watching the program, and at the same time, the field of current schedule is updated (the field is changed to 7), and the playing time is changed to the playing time of the seventh episode. If the last episode is watched, the field of current schedule is changed to −1, which indicates that the program has been played in the main channel.

If playing information of a next episode cannot be found in the EPG information, the field of current schedule is set to −1, so that information need not be taken statistics on in case that the user terminal is in a shut-down status for a long time.

Finally, information of all programs of all channels is detected sequentially according to the EPG information, so as to check whether the missed program is played currently (corresponding to step 113). If the missed program is played, a service of watching the missed program is implemented (corresponding to step 115). If no missed program is played, the current basic service is continued (corresponding to step 117).

The local table of missed programs further includes a local table of common programs, and the basic format of the table is as follows:

recorded in No. 2 in the table is missed because the user fails to watch it when the main channel XXTV plays the program 2.

Played or not: whether the program has been played in the main channel.

Playing time: the playing time of the program in the main channel. The field may include information of year, month, date, hour, minute, and second.

Times of choosing not to watch: when detecting that the missed program of the user is played, the user terminal prompts the user for whether to watch the missed program, by playing reminding information in a display screen, or by playing a reminding tone, or by another method. When the user chooses not to watch the missed program, the record value is added by 1 each time the user chooses not to watch the missed program. The initial value of the record value is 0. In this manner, the user will not be prompted for whether to watch the program which the user chooses not to watch the missed program for several times based on a certain policy. For example, if it is preset that the times the user chooses not to watch the missed program is greater than a particular number, the user terminal considers that the user need not to watch the program, and then cancels the reminding for the program.

Furthermore, certain fields of the two types of the local table of missed programs being the local table of missed series and the local table of missed common programs can be appropriately adjusted and integrated into a table in which the series and the common programs are not distinguished. The local table of missed programs is stored in a non-volatile memory of the user terminal, so as to ensure that the information of the local table of missed programs will not be lost when the user terminal is shut down and powered off.

A missed program reminding table is also associated with the local table of missed programs. In step 111 in FIG. 1, the missed program reminding table needs to be updated according to the implementation situation of step 109. Table 3 is an instance of the missed program reminding table, and its basic format is as follows:

TABLE 2

Local table of missed common programs

| No. | Name of program | Alias of program | Language | Missed or not | Main channel | Played or not | Playing time | Times of choosing not to watch |
|---|---|---|---|---|---|---|---|---|
| 1 | Program 1 | Alias 1 of program 1 | Chinese | No | CCTV1 | No | 2008-08-09 10:30:00 | 0 |
| 2 | Program 2 | | Cantonese | Yes | XX TV | Yes | 2008-08-10 14:00:00 | 1 |
| 3 | Program 3 | | English | Yes | XX TV | Yes | 2008-08-11 20:00:00 | 0 |
| 4 | Program 4 | | Chinese | No | XX TV | No | 2008-08-09 8:00:00 | 0 |

The definition of each field in Table 2 is as follows.

No.: the unique identifier of each program record.

Name of program: the name of the TV program.

Alias of program: different names that the same program may have.

Language: the dubbing language of the program.

Missed or not: whether the program is missed in the main channel.

Main channel: the channel on which the recorded data of the missed program is based. For example, the program 2

TABLE 3

Missed program reminding table

| No. | Missing associated table | Missing associated serial number | Serial number of program | Playing time | Playing channel |
|---|---|---|---|---|---|
| 1 | 2 | 40 | 0 | 2008-08-08 8:30:00 | CCTV |
| 2 | 1 | 3 | 9 | 2008-08-09 10:00:00 | SDTV |

TABLE 3-continued

Missed program reminding table

| No. | Missing associated table | Missing associated serial number | Serial number of program | Playing time | Playing channel |
|---|---|---|---|---|---|
| 3 | 1 | 3 | 5 | 2008-08-09 14:30:00 | SZTV |
| 4 | 1 | 3 | 5 | 2008-08-11 15:00:00 | SCTV |

The definition of each field in Table 3 is as follows.

No: the unique identifier of each record.

Missing associated table: when the value is 1, it indicates that it is the corresponding local table of missed series, when the value is 2, it indicates that it is the corresponding local table of missed common programs. If the local table of missed series and the local table of missed common programs are integrated into one table, this field can be omitted.

Missing associated serial number: the record number (serial number) in the local table of missed programs. The missed program reminding table is associated with the local table of missed programs through this field.

Serial number of program: if the value is not 0, it indicates a serial number of an episode of the series, and if the value is 0, it indicates a common program.

Playing time: the playing time of the relevant program. This field may include information of year, month, date, hour, minute, and second.

Playing channel: the channel on which the program is played.

For example, connecting the local table of missed programs of series 1 of the local table of missed programs with the missed program reminding table 3, the record of No. 3 in the missed program reminding table indicates that the fifth episode of series 3 which the user missed will be played on SZTV at 14:30.

The missed program reminding table may be stored in the non-volatile memory or a volatile memory of the user terminal.

Figure 2:
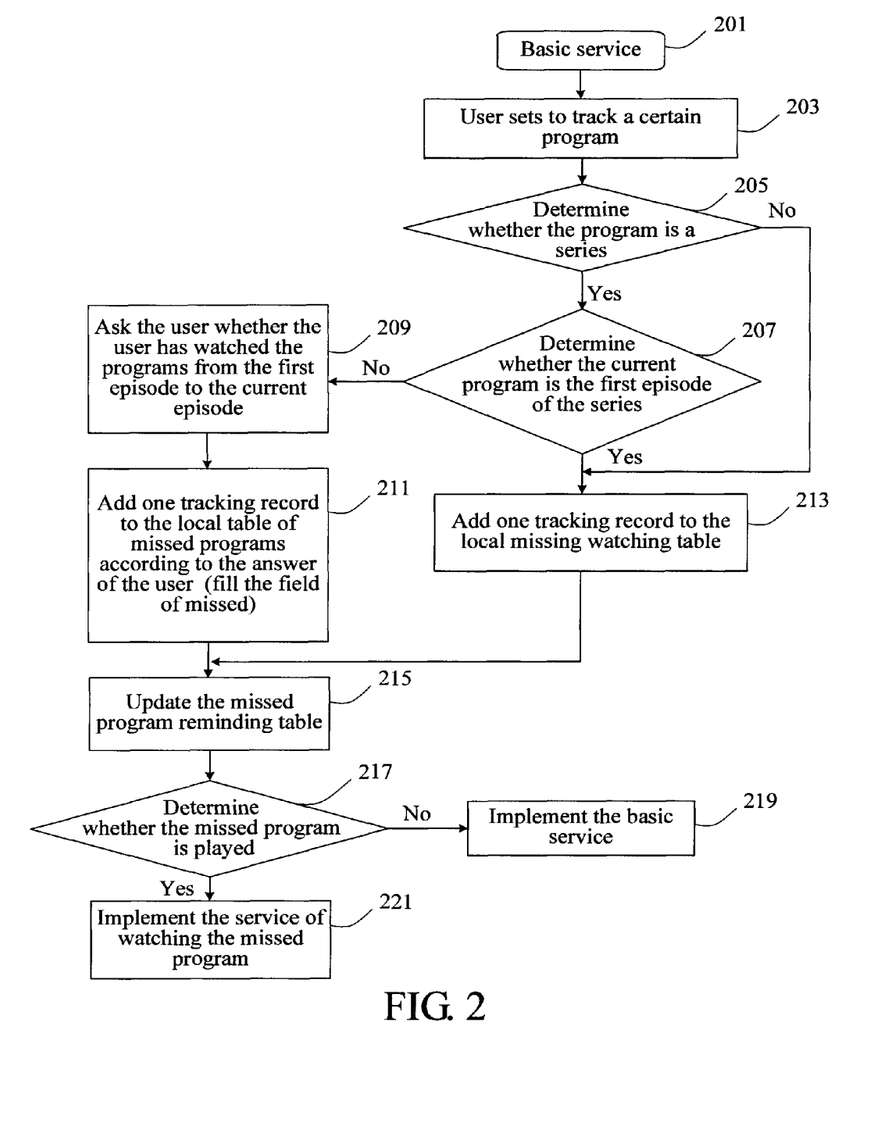
FIG. 2 is a flow chart of setting to track information of a missed program according to an embodiment of the present invention.

Before the local table of missed programs is obtained, the method further includes setting the local table of missed programs, which corresponds to step 105 in FIG. 1. Referring to FIG. 2, it is a flow chart of setting to track information of the missed program according to an embodiment of the present invention.

Step 201: The user performs a basic service currently.

Step 203: When performing the basic service, the user triggers and accesses a missed program management page, and selects a program to be tracked from the EPG information based on preference, that is, records the program in the local table of missed programs.

Step 205: After the user sets to track a certain program, the system determines whether the program is a series. Specifically, it is determined whether the tracked program is a series by determining whether the name of the program in the EPG information distributed by the headend includes brackets "( )" and whether a number is in the bracket.

Therefore, a mode for naming the TV program in the EPG information distributed by the headend needs to be: "name of the series"+"("+"serial number of an episode"+")", for example, The Past Golden Age (11).

Step 207: If the tracked program is a series, it continues to determine whether the current program is the first episode of the series. If the tracked program is not the first episode of the series, perform step 209; if the tracked program is the first episode of the series, perform step 213.

Step 209: If the tracked program is not the first episode of the series, the user is asked for a watching situation from the first episode to the current episode.

Step 211: According to the watching situation answered by the user, add one record to the local table of missed programs to fill the field of missed. For example, if the fifth episode is played currently, and the user has missed the foregoing four episodes, so the field of missed can be filled with 1, 2, 3, 4, and 5.

Step 213: If the tracked program is not a series or is the first episode of the series, add one record to the local table of missed programs. For example, if the tracked program is the first episode of the series, one record can be added to the local table of missed series, and 1 is filled in the field of missed; and if the tracked program is not the series, one record can be added to the local table of missed common programs.

Step 215: Update the missed program reminding table according to the local table of missed programs and the EPG information.

Step 217: Detect information of all programs of all channels in the EPG information sequentially, and determine whether the missed program is played currently. If no missed program is played, perform step 219, if a missed program is played, perform step 221.

Step 219: When no missed program is played currently, implement a basic service.

Step 221: When the missed program is played currently, implement a service of watching the missed program.

The management of the missed programs by the user further includes deleting the information of the missed programs in addition to setting to track the information of the missed programs.

When performing the basic service, the user can trigger (specifically through a remote control) and access the missed program management page, in which the user can view all the programs that have been tracked in the system and watching situation of missed programs. The user can set to track a new program in this page, and can also delete the tracking of a certain program. When the user deletes the tracking of a certain program, the user terminal will delete the relevant record from the local table of missed programs, will no longer search for the program or perform the missing reminding for the program, and at the same time, will delete the relevant record from the missed program reminding table.

Figure 3:
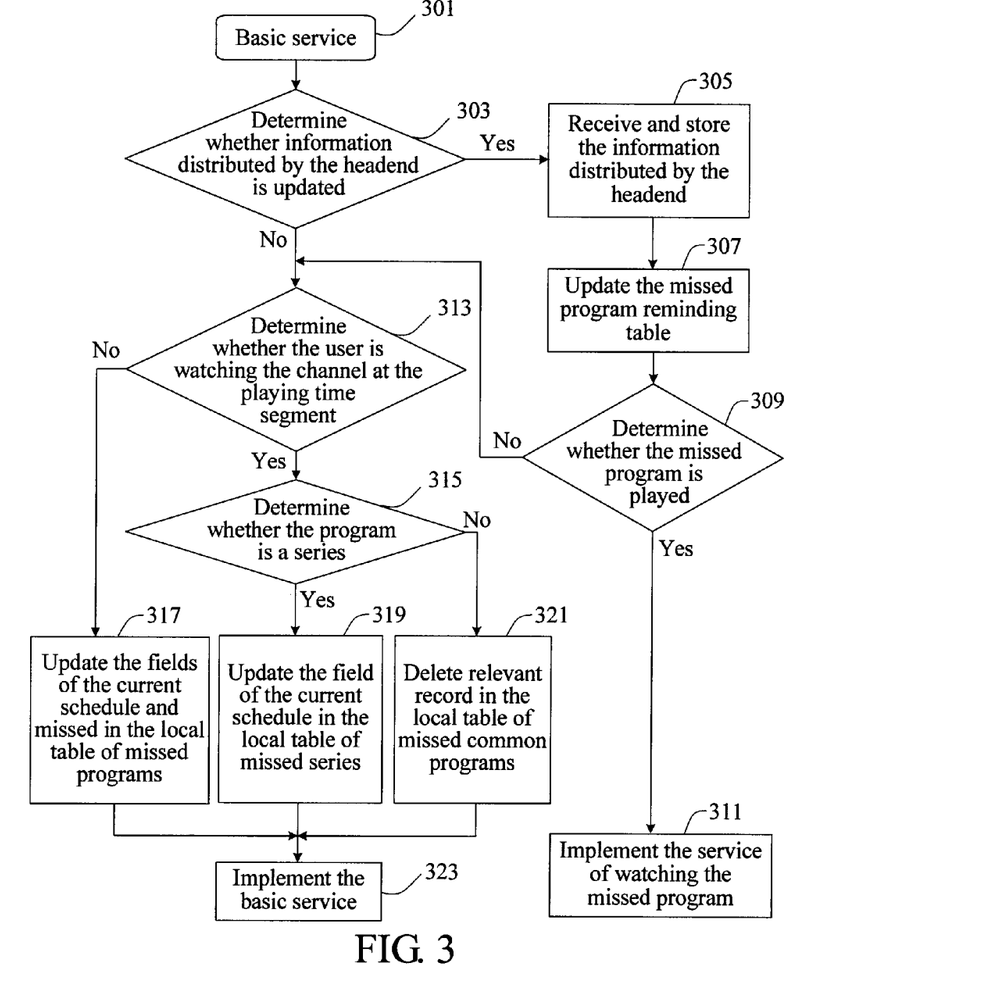
FIG. 3 is a flow chart of updating information of a missed program according to an embodiment of the present invention.

The management of the information of missed set by the user performed by the user terminal includes updating of the information of missed, and specifically, the updating of the local table of missed programs in Step 109 in FIG. 1. Referring to FIG. 3, it is a flow chart of updating the information of the missed program according to an embodiment of the present invention.

Step 301: The user terminal performs a basic service currently.

Step 303: After receiving the EPG information distributed by the headend, the user terminal detects and determines whether there is updating information for the EPG information, and if there is updating information for the EPG information, perform step 305, if there is no updating information for the EPG information, perform step 313.

Step 305: The user terminal receives the EPG information distributed by the headend, and stores the information in the user terminal.

Step 307: Update the missed program reminding table according to the EPG information.

Step 309: Determine whether the missed program is played currently, and if the missed program is played currently, perform step 311; if the missed program is not played currently, perform step 313.

Step 311: When the missed program is played, implement the service of watching the missed program.

Step 313: If the information distributed by the headend is not updated, or no missed program is played currently, determine whether the user is watching the channel during the playing time segment of the tracked program set by the user. If the user has watched the set tracked program, perform step 315; otherwise, perform step 317. Specifically, it is determined whether the user terminal is in the designated channel in the local table of missed programs during the playing time of the program, and if the user terminal is in the designated channel, the user terminal can determine that the user has watched the set tracked program.

Step 315: When the user watches the set tracked program, it is further determined whether the program is a series. If the program is a series, perform step 319; If the above program is not a series, perform step 321.

Step 317: If the user does not watch the missed program in the set channel during the playing time segment, update information in the fields of current schedule and missed in the local table of missed programs, and continue the current basic service. For example, referring to Table 1, if the user misses the tenth episode of the series 2, 10 is added to the field of missed in Table 1, and the field of current schedule is changed to 11. It indicates that the tenth episode is missed, and the episode to be played is the eleventh episode.

Step 319: If the user watches the set tracked program, and the tracked program is a series, update the field of current schedule in the local table of missed series, and continue the current basic service. For example, referring to Table 1, if the user watches the tenth episode of series 2, the field of current schedule is changed to 11, which indicates the program to be played is the eleventh episode.

Step 321: If the user watches the set tracked program, and the tracked program is a common program other than a series, delete the relevant record in the local table of missed common programs, and continue the current basic service.

Step 323: When the updating procedure in step 317, or step 319, or step 321 has been completed, the user terminal continues to implement the basic service.

Corresponding to the updating of the missed information, after the local table of missed programs is updated, the missed program reminding table also needs to be updated. When the headend information is updated or a new program is set to be tracked, the user terminal searches for the missed program, and stores the searched results to the missed program reminding table. When the tracked program is deleted, the missed program reminding table needs to be updated by deleting the relevant record. After the user is prompted for whether to perform the service of watching the missed program, the corresponding reminding record is deleted from the missed program reminding table.

Figure 4:
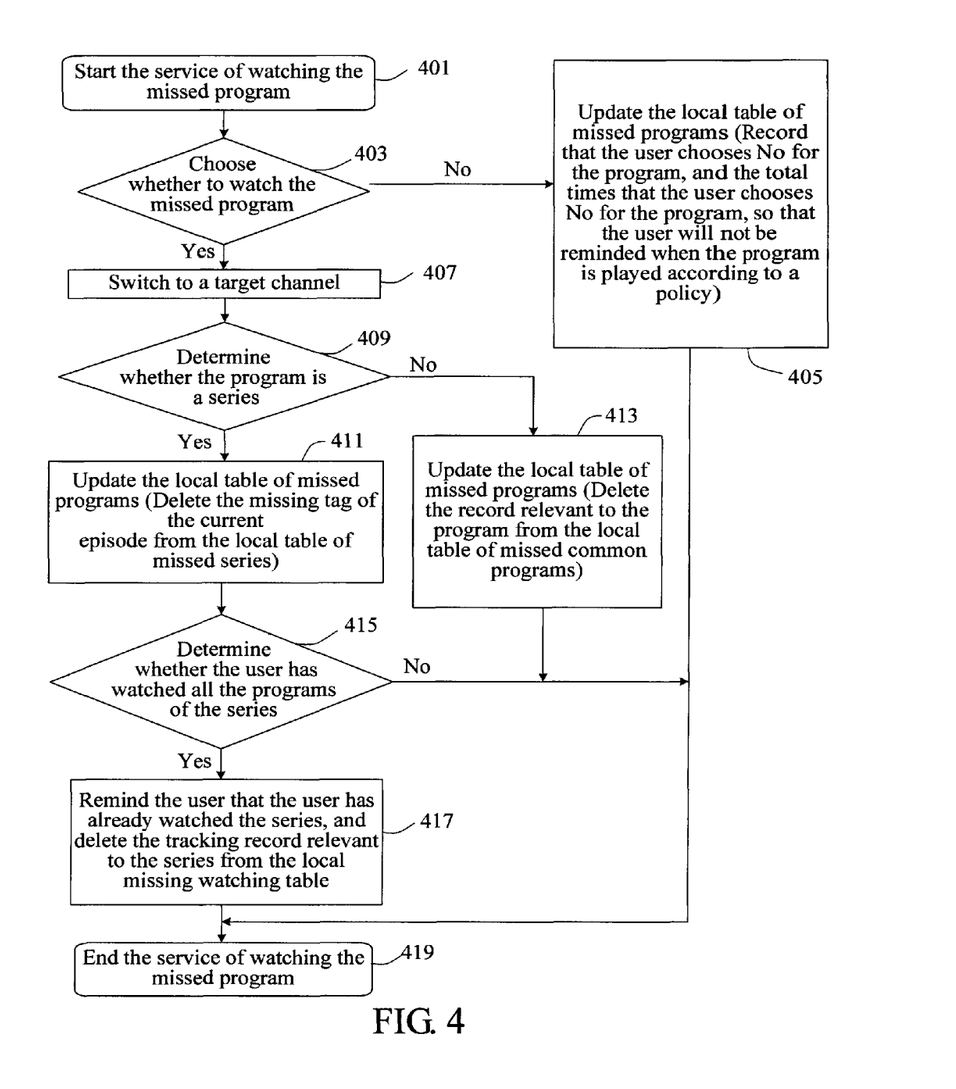
FIG. 4 is a flow chart of implementing a service of watching a missed program according to an embodiment of the present invention.

The implementation of the service of watching the missed program is described in detail in the following, which can be corresponding to Step 115 in FIG. 1. Referring to FIG. 4, it is a flow chart of implementing the service of watching the missed program according to an embodiment of the present invention.

Step 401: Start the service of watching the missed program.

Step 403: When implementing the basic service, if the user terminal determines that the program missed by the user is played, pop up information for prompting the user to choose whether to watch the missed program, and if the user chooses to watch the missed program, perform step 407; otherwise, perform step 405. When it is determined that the program missed by the user is played, the user can be reminded according to a certain policy. For example, before the missed program is played, the user may be reminded in advance; before the missed program is played and after the user is reminded in advance, the reminding information is continuously displayed on the display screen or is displayed by short-interval flashes right before the missed program is played; the user may be reminded by sound or voice; or the user may be reminded by a combination of the voice and the display screen.

Step 405: When the user chooses not to watch the missed program, the local table of missed programs is updated, and the times that the user chooses not to watch the program, and the accumulated times that the user chooses not to watch missed programs are recorded and counted. Therefore, the user will not be reminded of watching the program which the user chooses not to watch for times based on a certain policy. For example, if it is preset that when the times the user chooses not to watch is greater than a particular number, the user terminal considers that the user need not watch the program, and then cancels the reminding for the program.

Step 407: Switch the user terminal to the corresponding target channel in the local table of missed programs.

Step 409: Determine whether the missed program is a series program. If the missed program is a series program, perform step 411; otherwise, perform step 413.

Step 411: If the missed program is a series, delete the missing tag of the current episode from the local table of missed series.

Step 413: If the missed program is a common program, delete the record relevant to the program from the local table of missed common programs.

Step 415: After the missing tag of the current episode is deleted from the local table of missed series, further determine whether the user has watched each episode of the series, that is, all the programs corresponding to the series). If the user has watched each episode of the series, perform step 417; otherwise, perform step 419.

Step 417: Prompt that the user has finished watching all the episodes, and delete the tracking record relevant to the series from the local table of missed programs.

Step 419: The service of watch the missed program ends.

The user terminal according to the embodiments may include a digital TV set top box, an integrated digital TV, a personal computer, a handheld terminal, and so on.

In view of the above, by using the method for watching the missed TV program according to the embodiments of the present invention, the relevant information in the EPG information can be automatically searched for after the user selects the information about a missed program once only, and then the search results are returned, so that the user need only search limited and a small amount of results, and pertinence of the search results is improved. Further, when the missed program appears, the user is reminded in time of watching it, so that after missing a certain program, the user can obtain the TV watching situation of the corresponding program and obtain the corresponding prompt when the program is played through simple operations, so that the program will not be missed again. Therefore, the user can watch the missed program, and the experience of the user in watching the program is promoted.

Figure 5:
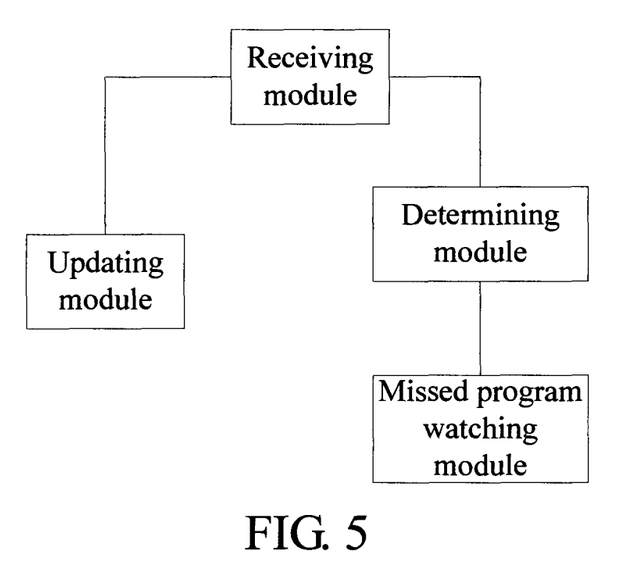
FIG. 5 is a schematic structural view of modules of a user terminal according to an embodiment of the present invention.

In another embodiment, the present invention further provides a user terminal. Referring to FIG. 5, it is a schematic structural view of modules of the user terminal according to an embodiment of the present invention. The user terminal includes a receiving module, a determining module, an updating module, and a missed program watching module. The receiving module is configured to receive EPG information distributed by a headend after the user terminal starts to work, and obtain a local table of missed programs and current time. The determining module is connected to the receiving module, and is configured to determine whether a program is missed when the user terminal is in a non-working status according to the local table of missed programs and the current time. The updating module is connected to the receiving module, and is configured to update information of the missed program in the local table of missed programs according to the EPG information. The missed program watching module is connected to the determining module, and is configured to sequentially detect whether the missed program is played currently according to rules, and if the missed program is played, implement a service of watching the missed program.

The local table of missed programs includes a local table of missed series and a local table of missed common programs. The user terminal may further include a storage module, configured to store the local table of missed series, the local table of missed common programs, and a missed program reminding table associated with the local table of missed series and the local table of missed common programs.

The user terminal may further include a prompting module, configured to prompt the user for whether to implement the service of watching the missed program according to playing time of the missed program in the missed program reminding table.

Details for the local table of missed series, the local table of missed common programs, and the missed program reminding table may be obtained with reference to the instances of Table 1, Table 2, and Table 3 in the embodiments of the method provided by the present invention, and will not be described in detail here.

The user terminal mentioned in the embodiments may include a digital TV set top box, an integrated digital TV, a personal computer, and a handheld terminal.

In view of the above, by using the user terminal according to the embodiments of the present invention, relevant information in the EPG information can be automatically searched for after the user selects the information about a missed program once only, and when a missed program appears, the user is reminded in time of watching it, so that after missing a certain program, the user can obtain a watching situation of the corresponding program and obtain a corresponding reminding when the program is played through simple operations, so that the user can watch the missed program, and therefore the experience of the user in watching the program is improved.

The steps of the method and algorithm described with reference to the embodiments herein may be implemented with hardware, a software module executed by a processor, or a combination thereof. The software module can be disposed in a random access memory (RAM), memory, read-only memory (ROM), electrically programmable read-only memory (EPROM), electrically erasable and programmable read-only memory (EEPROM), register, hard disk, removable disk, CD-ROM, or any other form of storage medium that is known to persons skilled in the art.

Apparently, persons skilled in the art can make various modifications and variations without departing from the spirit and scope of the invention. The invention is intended to cover the modifications and variations provided that they fall in the scope of protection defined by the appended claims or their equivalents.

What is claimed is:

1. A method for watching missed television (TV) programs, comprising:
   receiving Electronic Program Guide (EPG) information distributed by a headend;
   obtaining a local table of missed programs and a current time, wherein the local table of missed programs comprises a local table of missed series and a local table of missed common programs, and wherein the local table is stored at a user terminal;
   determining that a program has been missed when the user terminal is in a non-working status according to the local table of missed programs and the current time;
   updating information of the missed program in the local table of missed programs according to the EPG information;
   detecting whether the missed program is currently being played; and
   implementing a service of watching the missed program when it is detected that the missed program is currently being played,
   wherein implementing the service of watching the missed program comprises:
      switching to a target channel and updating the local table of missed programs when a user chooses to watch the missed program at the user terminal;
      determining whether the missed program is a series by determining whether a name of a program in the EPG information distributed by the headend includes brackets and whether a number is in the brackets;
      determining a missing tag of a current episode from the local table of missed series and determining whether all episodes of the series have been watched when the missed program is in the series;
      notifying the user that all the episodes of the series have been watched and deleting a tracking record relevant to the series from the local table of missed programs when all the episodes of the series have been watched; and
      deleting a tracking record relevant to the missed program from the local table of missed common programs when the missed program is not in the series,
   wherein the local table of missed series comprises a plurality of columns of information, and wherein the plurality of columns of information comprises a name column, an alias column, a total number of episodes column, a language column, a main channel column, a current schedule column, and a playing time column, and
   wherein the local table of missed common programs comprises a plurality of columns of information, and wherein the plurality of columns of information comprises a name column, an alias column, a language column, a missed or not missed column, a main channel column, a played or not played column, a playing time column, and a times of choosing not to watch column.

2. The method according to claim 1, wherein detecting whether the missed program is currently being played comprises sequentially detecting information of all programs of all channels in the EPG information, and checking whether the missed program is currently being played.

3. The method according to claim 1, further comprising setting the local table of missed programs, and wherein setting the local table of missed programs comprises:
   selecting and tracking the missed program according to the EPG information;

recording information of the missed program in the local table of missed programs;

adding one record to the local table of missed series according to a watching situation input by the user when the missed program is in the series and when it is determined that the missed program is not the first episode of the series; and adding one record to the local table of missed common programs when the missed program is not in the series.

4. The method according to claim 3, wherein after setting the local table of missed programs, the method further comprises setting a missed program reminding table, wherein the missed program reminding table is associated with the local table of missed series and the local table of missed common programs, and wherein after adding one record to the local table of missed programs, the method further comprises updating the missed program reminding table according to the local table of missed programs and the EPG information.

5. The method according to claim 4, further comprising canceling the tracking of the missed program, and deleting the information of the missed program from the local table of missed programs and the missed program reminding table.

6. The method according to claim 4, wherein the missed program reminding table comprises a plurality of columns of information, and wherein the plurality of columns of information comprises a serial number column, a playing time column, and a playing channel column.

7. The method according to claim 1, wherein updating the information of the missed program in the local table of missed programs according to the EPG information comprises:

determining whether the missed program is played in a corresponding channel during a playing time segment;

updating a current schedule in the local table of missed series when the missed program is played and the missed program is in the series; and deleting a relevant record of the missed program from the local table of missed common programs when the missed program is not in the series.

8. The method according to claim 1, wherein the brackets comprise "( )" type brackets.

9. The method according to claim 1, wherein the number in the brackets comprises a serial number associated with the program.

10. The method according to claim 1, wherein the name of the program is in a form comprising "name of series" plus "(serial number of an episode)."

11. The method according to claim 1, further comprising prompting the user to watch the missed program a second time when the user chooses not to watch the missed program.

12. The method according to claim 1, further comprising prompting the user to watch the missed program up to a preset number of times when the user chooses not to watch the missed program, wherein the preset number of times is determined based at least in part on a set policy.

13. The method according to claim 1, further comprising repeatedly prompting the user to watch the program, counting a number of times that the user chooses to not watch the program, and stop prompting the user to watch the program when the counted number of times reaches a certain number.

14. The method according to claim 1, wherein prompting the user to choose whether to watch the missed program comprises displaying pop up information on a display screen before the missed program is played.

15. The method according to claim 14, wherein displaying the pop up information comprises continuously displaying the pop up information on the display screen before the missed program is played.

16. The method according to claim 14, wherein displaying the pop up information comprises displaying the pop up information in short-interval flashes before the missed program is played.

17. The method according to claim 1, wherein prompting the user to choose whether to watch the missed program comprises providing the user with a sound prompt or a voice prompt.

18. The method according to claim 1, wherein prompting the user to choose whether to watch the missed program comprises providing the user with a prompt that comprises a combination of visual and audio effects.

* * * * *